United States Patent Office 2,754,323
Patented July 10, 1956

2,754,323

FLUOROBUTADIENECARBOXYLIC ACIDS AND DERIVATIVES HYDROLYZABLE THERETO

John L. Anderson, Wilmington, Del., assignor to E. I. du Pont de Nemours and Company, Wilmington, Del., a corporation of Delaware No Drawing. Application August 28, 1953,
Serial No. 377,257

13 Claims. (Cl. 260—486)

This invention relates to certain new and useful halogenated organic compounds, and more particularly to new fluorine-containing dienes and their method of preparation.

Fluorine-containing dienes are useful in various applications, such as their use as intermediates in a variety of chemical reactions involving the ethylenic double bonds, and particularly their polymerization to valuable polymers. Many of the advantages of these particular fluorine-containing diene polymers reside in the chemical inertness imparted to the compound by the fluorine substituents. However, in some applications it is desirable to have a conjugated diene which contains in addition to the halogen substituents certain functional substituents which can be reacted with complementary reactants to produce new compounds having unusual properties.

It is therefore an object of this invention to provide new and useful fluorine-containing dienes. Another object is the provision of a method of preparing such dienes from readily available fluorocyclobutenes by a simple and economical method. A still further object is the provision of a method by which fluorine-containing dienes may be prepared from fluorocyclobutenes by simple pyrolysis. Other objects will appear as the description of the invention proceeds.

These and other objects are accomplished by the present invention of the new class of fluoro-1,3-butadienes having the formula:

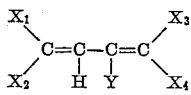

wherein the X's are halogen of atomic number not greater than 35, at least one of which is fluorine, and Y is carboxyl (—COOH), or a group hydrolyzable thereto, e. g., —COOR, —CONR'$_2$, —COX, or —CN in which R is a monovalent hydrocarbon or halogenated hydrocarbon radical wherein the halogen is of atomic number not greater than 35; R' is the same as R or a hydrogen; and X is a halogen of atomic number not greater than 35. The hydrocarbon radicals represented by R and R' may be alkyl, cycloalkyl, alkenyl, cycloalkenyl, aryl, aralkyl, or alkaryl. The halogen represented by any of the X's may be fluorine, chlorine, or bromine.

The invention also includes the addition polymers of the above-described fluorinated dienes. A preferred group of fluorine-containing butadienes of this invention is the class of butadienes of the above formula in which two fluorine atoms are attached to one of the terminal carbon atoms.

The products of this invention are conveniently made by passing a fluorocyclobutene of the formula

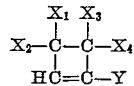

in which the symbols have the same significance as in the general formula for the products of this invention, and preferably such a fluorocyclobutene having two fluorine atoms attached to one carbon atom of the cyclobutene ring, through a reaction zone heated to a temperature of from 400° to 725° C. The lower temperatures in this range give significant conversions of the fluorocyclobutene to the fluorobutadiene. However, it is preferred to use pyrolysis temperatures of 500° to 725° C. since these higher temperatures give higher conversions to the desired products. Temperatures above 725° C. are undesirable because of the tendency for side reactions to take place at such high temperatures.

The group represented by Y, when other than —COOH, may be hydrolyzed either before or after pyrolysis.

The pressure at which the pyrolysis of the fluorocyclobutene is carried out is not critical, pressures ranging from a few microns of mercury to atmospheric or even superatmospheric being operable. In general, it is preferred to use the lower pressures, i. e., pressures of less than 50 mm. of mercury, in order to remove the reaction products from the reaction zone as rapidly as possible so that formation of undesirable by-products is minimized.

The rate at which the fluorocyclobutene is passed through the reaction zone is not critical, although for economical reasons it is preferred to use a rate as high as possible. It is only necessary to heat the fluorocyclobutene to the reaction temperature for a short time to obtain the desired splitting of the cyclobutene ring. The actual rate of flow of fluorocyclobutene through the reactor is dependent, of course, on the capacity of the heater surrounding the reaction zone. The greater the heat capacity of the heater the greater is the rate at which the fluorocyclobutene can be passed through the reaction zone.

The reactor can be constructed of any inert heat-resistant material. For example, the reactor can be made of quartz, heat-resistant glass, stainless steel or other inert metal. The reactor can, if desired, be packed with inert materials, for example, granular quartz, to provide better heat transfer to the reaction mixture. Metals which react with the fluorocyclobutenes under the operating conditions to give undesirable by-products should not be used. The reaction zone can be heated by conventional means, for example, by electric heaters or by gas-fired heaters.

The fluorobutadienes of this invention having carboxyl groups or groups hydrolyzable thereto can be polymerized by conventional addition techniques. Thus they can be polymerized by the common bulk, solution, or emulsion polymerization methods in the presence of free radical-liberating, vinyl polymerization initiators. Useful initiators include the azo compounds of the type described in U. S. Patent No. 2,471,959, and peroxy compounds such as, for example, benzoyl peroxide, and ammonium persulfate. The polymerizations can be carried out over a wide range of temperatures, for example, at temperatures between 0° and 150° C., the exact temperature employed being one at which the initiator being used liberates free radicals readily.

The cyclobutene starting materials used in making the products of this invention can be made directly by cycloalkylation reactions involving, a fluoroolefin and an acetylenic carboxylic acid derivative, e. g., tetrafluoroethylene and methyl propiolate. They can also be made indirectly by condensing a fluoroolefin with an unsaturated halogenated carboxylic acid derivative followed by dehydrohalogenation.

The following examples are given by way of illustration only and not by way of limitation, since the temperatures, pressures and starting materials may vary in any

3 of the examples within the scope of the above disclosure. It is also to be understood that while the invention is illustrated in the examples by the use of the fluoro- and fluorochlorocyclobutenes, the corresponding fluoroiodo and fluorobromo compounds may be used. In the examples the proportions are expressed in parts by weight unless otherwise specified.

Example I 10 parts of 1-carbomethoxy-3,3,4,4-tetrafluorocyclobutene is distilled through a vertical cylindrical quartz tube one inch in diameter and 12 inches long containing quartz packing maintained at a temperature of 500° C. by an electric heater. The pressure is maintained at 1 micron of mercury (measured between an adjacent cold trap and the mercury diffusion pump). The products of pyrolysis are quenched at liquid nitrogen temperature (−196°C.) and are then analyzed by infrared absorption. The products comprise 7.4 parts of the starting material, i. e., 1-carbomethoxy-3,3,4,4-tetrafluorocyclobutene, and approximately 2.5 parts of 2-carbomethoxy-1,1,4,4-tetrafluoro-1,3-butadiene.

Similar results are obtained in pyrolyses of 1-carbomethoxy-3,3,4,4-tetrafluorocyclobutene by the process described in Example I with the exceptions that the pyrolyses are carried out at 550° and 600° C.

Example II

Using apparatus similar to that described in Example I, 20 parts of 1-carbomethoxy-3,3,4,4-tetrafluorocyclobutene is heated at 550° C. and at 10 mm. mercury pressure. 2-carbomethoxy-1,1,4,4-tetrafluoro-1,3-butadiene is obtained in 25% conversion.

Example III 600 parts of 1-carbomethoxy-3,3,4,4-tetrafluorocyclobutene is pyrolyzed in apparatus of the type described in Example I by distillation over a quartz bed at 525° C. and at 10 microns mercury pressure. There is obtained in the cold trap 250 parts of 2-carbomethoxy-1,1,4,4-tetrafluoro-1,3-butadiene. This compound, B. P. 40–42° C./25 mm. mercury, exhibits an infrared absorption spectrum which is consistent with this structure, and has a refractive index, $n_D^{25}$, of 1.3795.

*Analysis.*—Calc'd for $C_6H_4O_2F_4$: C, 39.1%; H, 2.18%; M. W., 184. Found: C, 38.82%; H, 2.50%; M. W., 186.

133 parts of 2-carbomethoxy-1,1,4,4-tetrafluoro-1,3-butadiene is polymerized by heating for 18 hours with 1 part of di-t.-butyl peroxide at 130° C. and at 8500 atm. pressure. There is obtained 50 parts of a viscous oil. Fractionation of this oil by dissolving it in benzene and precipitating by addition of low boiling petroleum ether gives a solid polymer of 2-carbomethoxy-1,1,4,4-tetrafluoro-1,3-butadiene and a lower molecular weight oil. The oily polymer of 2-carbomethoxy-1,1,4,4-tetrafluoro-1,3-butadiene has a molecular weight of 518, and the solid polymer has a molecular weight of 1160.

Example IV 250 parts of 1-carbomethoxy-4-chloro-3,3,4-trifluorocyclobutene is pyrolyzed by dropwise addition through the cylindrical quartz tube described in Example I held at 550° C. and 2 mm. mercury pressure. The reaction products are isolated by rapid quenching at liquid nitrogen temperature in the cold trap and are then distilled. There is obtained 100 parts of 2-carbomethoxy-1-chloro-1,4,4-trifluoro-1,3-butadiene, boiling at 62°–64° C./21 mm. mercury, $n_D^{25}$ 1.4224. The infrared absorption spectrum is consistent only with the diene structure.

*Analysis.*—Calc'd for $C_6H_6F_3ClO_2$: C, 35.9%; H, 1.99%. Found: C, 35.85%; H, 2.26%.

Example V 250 parts of 1-carbomethoxy-4,4-dichloro-3,3-difluorocyclobutene is passed by dropwise addition through a cylindrical quartz tube of the type described in Example I maintained at 550° C. and 10 mm. mercury pressure.

4

The pyrolysis products are collected in a trap cooled to −80° C. On distillation of the reaction product there is obtained 50 parts of 2-carbomethoxy-1,1-dichloro-4,4-difluoro-1,3-butadiene boiling at 73° C./19 mm., $n_D^{25}$ 1.4267.

*Analysis.*—Calc'd for $C_6H_4F_2Cl_2O_2$: C, 33.1%; H, 1.48%; M. W., 217. Found: C, 33.29%; H, 2.06%; M. W., 219.

The products of this invention have been illustrated in the examples with specific reference to certain fluorobutadienes. However, the invention includes any compound of the formula

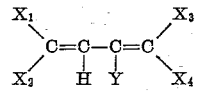

wherein the X's are halogens of atomic number not greater than 35, i. e., fluorine, chlorine, or bromine at least one of which is fluorine, and Y is a carboxyl group or a group hydrolyzable thereto. Specific examples of other fluorobutadienes of this type which are included in the invention are: 2-cyano-1,1,4,4-tetrafluoro-1,3-butadiene, 2-carbamido-1,1,4,4-tetrafluoro-1,3-butadiene, 2-carboxy-1,1,4,4-tetrafluoro - 1,3 - butadiene, 2-carbo(heptafluorobutyl)oxy-1,1,4,4-tetrafluoro-1,3-butadiene, 2 - N,N'-diethylcarbamido-1,1-dichloro-4,4-difluoro-1,3-butadiene, 2-carboethoxy-1,1-difluoro-4,4-dichloro-1,3-butadiene, 2-chlorocarbonyl-1-chloro-1,4,4-trifluoro-1,3-butadiene, 2-(N-butyl-carbamido)-1-bromo-1,4,4-trifluoro-1,3-butadiene, and 2-fluorocarbonyl-1,1,4-trichloro-4-fluoro-1,3-butadiene.

The specific fluorobutadienes mentioned in the preceding paragraph can be prepared by pyrolyzing at 400° to 725° C. the following fluorocyclobutenes: 1-cyano-3,3,4,4-tetrafluorocyclobutene, 1 - carbamido - 3,3,4,4-tetrafluorocyclobutene, 1-carboxy-3,3,4,4-tetrafluorocyclobutene, 1-carbo(heptafluorobutyl)oxy - 3,3,4,4 - tetrafluorocyclobutene, 1 - N,N'-diethylcarbamido-3,3-difluoro-4,4-dichlorocyclobutene, 1-carboethoxy-3,3-dichloro-4,4-difluorocyclobutene, 1-chloro-carbonyl-3,3,4-trifluoro-4-chlorocyclobutene, 1 - N-butyl-carbamido-3,3,4-trifluoro-4-bromocyclobutene, and 1-fluorocarbonyl-3,3,4-trichloro-4-fluorocyclobutene.

Optionally, the butadienes listed above can be prepared by converting one acid function to another, e. g., 2-cyano-1,1,4,4-tetrafluoro-1,3-butadiene can be prepared by dehydration of 2-carbamido-1,1,4,4,-tetrafluoro-1,3-butadiene, and 2-carbomethoxy-1,1,4,4-tetrafluoro-1,3-butadiene can be hydrolyzed to 2-carboxy-1,1,4,4-tetrafluoro-1,3-butadiene. In some cases, substantially better yields of the desired diene acid derivative can be obtained by these conversions.

The fluorobutadienes of this invention are useful in many ways. They are useful as chemical intermediates; for example, they can be halogenated to the corresponding saturated fluorohalogenated compounds and they can be hydrogenated to saturated fluorohydrocarbons, both having a carboxylic functional group. Because of the presence of the carboxylic functional group in the products of this invention, they are especially useful because of the reactivity of these functional groups. For example, fluorobutadienes having a free carboxyl group can be reacted with an alcohol to form the corresponding ester. These fluorobutadienes are also useful for polymerization to polymers having carboxylic functional groups, e. g., the —COOH, —COOR, —CN, —COX, etc. groups. These polymers, having functional carboxylic groups, can in turn be reacted with complementary carboxylic-reactive groups to obtain new polymers having unusual properties. Thus, a polymer having free carboxyl groups can be reacted with a polyalcohol to obtain a novel polymer having ester cross-linking groups. The polymers of this invention are useful as films, adhesives, coating compositions and the like.

The fluorobutadiene produced by pyrolysis may be polymerized alone or with one or more polymerizable ethylenic unsaturated compounds, either before or after hydrolysis of the group represented by Y.

It will be apparent that many widely different embodiments of this invention may be made without departing from the spirit and scope thereof, and therefore, it is not intended to be limited except as indicated in the appended claims.

I claim:
1. A fluoro-1,3-butadiene having the formula:

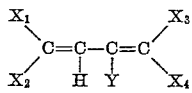

in which each X is a halogen of atomic number not greater than 35, at least one of which is fluorine, and Y is selected from the group consisting of carboxyl and groups hydrolyzable thereto.

2. The product of claim 1 in which two of the X's attached to one of the terminal carbon atoms are fluorine.

3. The process of preparing a fluoro-1,3-butadiene which comprises pyrolyzing at a temperature between 400° and 725° C. a fluorocyclobutene having 1 to 4 fluorine atoms attached to the butene ring, having hydrogen on one doubly bonded carbon, and having, on the other doubly bonded carbon, a carboxyl group or a group hydrolyzable thereto, any remaining substituents on the butene ring being halogen of atomic number not greater than 35.

4. The process of claim 3 in which the pyrolysis is carried out at a temperature between 500° and 725° C.

5. The process of claim 3 in which the pyrolysis is carried out at a pressure less than 50 mm. of mercury.

6. The process of claim 3 wherein the fluorocyclobutene pyrolyzed has two fluorine atoms on one carbon atom.

7. The process of claim 3 in which the said hydrolyzable groups are hydrolyzed to carboxyl after pyrolysis.

8. A polymer of the fluoro-1,3-butadiene of claim 1.

9. A polymer of the fluoro-1,3-butadiene of claim 2.

10. 2 - carbomethoxy - 1,1,4,4 - tetrafluoro - 1,3-butadiene.

11. A polymer of 2 - carbomethoxy - 1,1,4,4 - tetrafluoro - 1,3 - butadiene.

12. 2 - carbomethoxy - 1 - chloro - 1,4,4 - trifluoro-1,3 - butadiene.

13. 2 - carbomethoxy - 1,1 - dichloro - 4,4 - difluoro-1,3-butadiene.

References Cited in the file of this patent
UNITED STATES PATENTS

| | | |
|---|---|---|
| 2,190,369 | Rice | Feb. 13, 1940 |
| 2,668,182 | Miller | Feb. 2, 1954 |